(12) United States Patent
Bhupati

(10) Patent No.: US 11,710,509 B1
(45) Date of Patent: Jul. 25, 2023

(54) RETROACTIVE RECORDING OF A MEETING

(71) Applicant: Microsoft Technology Licensing, LLC, Redmond, WA (US)

(72) Inventor: Dhirendra Kumar Bhupati, Sammamish, WA (US)

(73) Assignee: Microsoft Technology Licesning, LLC, Redmond, WA (US)

( * ) Notice: Subject to any disclaimer, the term of this patent is extended or adjusted under 35 U.S.C. 154(b) by 0 days.

(21) Appl. No.: 17/590,269

(22) Filed: Feb. 1, 2022

(51) Int. Cl.
| | | |
|---|---|---|
| G11B 27/036 | (2006.01) | |
| G11B 27/00 | (2006.01) | |
| G11B 27/34 | (2006.01) | |
| H04L 9/40 | (2022.01) | |
| H04L 65/403 | (2022.01) | |
| H04L 65/60 | (2022.01) | |

(52) U.S. Cl.
CPC .......... *G11B 27/036* (2013.01); *G11B 27/002* (2013.01); *G11B 27/34* (2013.01); *H04L 63/0428* (2013.01); *H04L 65/403* (2013.01); *H04L 65/60* (2013.01)

(58) Field of Classification Search
None
See application file for complete search history.

(56) References Cited

U.S. PATENT DOCUMENTS

| | | | |
|---|---|---|---|
| 10,733,574 B2 | 8/2020 | Shen et al. | |
| 10,958,457 B1 * | 3/2021 | Davis | H04L 12/2803 |
| 2004/0263636 A1 * | 12/2004 | Cutler | H04N 7/15 348/211.3 |
| 2018/0032997 A1 * | 2/2018 | Gordon | G06Q 30/0269 |
| 2019/0303879 A1 * | 10/2019 | Mankovskii | G06F 3/167 |
| 2020/0228358 A1 | 7/2020 | Rampton | |
| 2021/0295851 A1 * | 9/2021 | Merkel | H04L 12/1831 |

OTHER PUBLICATIONS

"International Search Report and Written Opinion issued in PCT Application No. PCT/US2022/050812", dated Mar. 9, 2023, 13 Pages.

* cited by examiner

*Primary Examiner* — Hung Q Dang

(57) ABSTRACT

Systems and methods for recording a meeting using a retroactive record feature. The present technology provides for improved systems and methods for providing a recording of a virtual meeting, where a selection to initiate the recording from the beginning or an earlier time in the meeting from a current time may be received after the virtual meeting has started. The system may process received meeting content streams to generate a plurality of data segments that may collectively form a meeting recording. Each data segment, for example, may include meeting content associated with a particular user/attendee and associated with a timestamp and/or time duration. In some examples, the plurality of data segments may be stored on a blockchain, which may provide an immutable meeting record that may be concatenated together and made available for playback based on a selection to record the meeting and consent given by the users/attendees.

20 Claims, 9 Drawing Sheets

RETROACTIVE RECORDING OF A MEETING

BACKGROUND

Virtual meetings are an effective medium for disseminating information within and outside an enterprise. As virtual meetings, teleconferences, and virtual presentations have become more prominent, various virtual meeting applications offer an option to record meetings. While such recordings provide useful resources to revisit prior meetings or presentations, oftentimes, during a meeting or afterwards, a realization may be made that an option to record the meeting has (inadvertently or otherwise) not been selected. Thus, to catch up on or recall what was discussed and/or presented during the meeting, a user/attendee may have to rely upon notes taken during the meeting. In many cases, the notes may not be comprehensive or may not be accurately documented.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The present technology provides for improved systems and methods for providing a recording of a virtual meeting or presentation, where a selection to initiate the recording from the beginning of or from an earlier time in the meeting may be received after the virtual meeting or presentation has started. The system may process received meeting content streams to generate a plurality of data segments that may collectively form a meeting recording. Each data segment, for example, may include meeting content associated with a particular user/attendee and associated with a timestamp and/or time duration. In some examples, the plurality of data segments may be stored on a blockchain, which may provide an immutable meeting record that may be concatenated together and made available for playback based on a selection to record the meeting and consent given by the users/attendees.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings:

FIG. 3B depicts an example user interface for providing consent to allow access to recorded meeting content.

DETAILED DESCRIPTION

Figure 1:
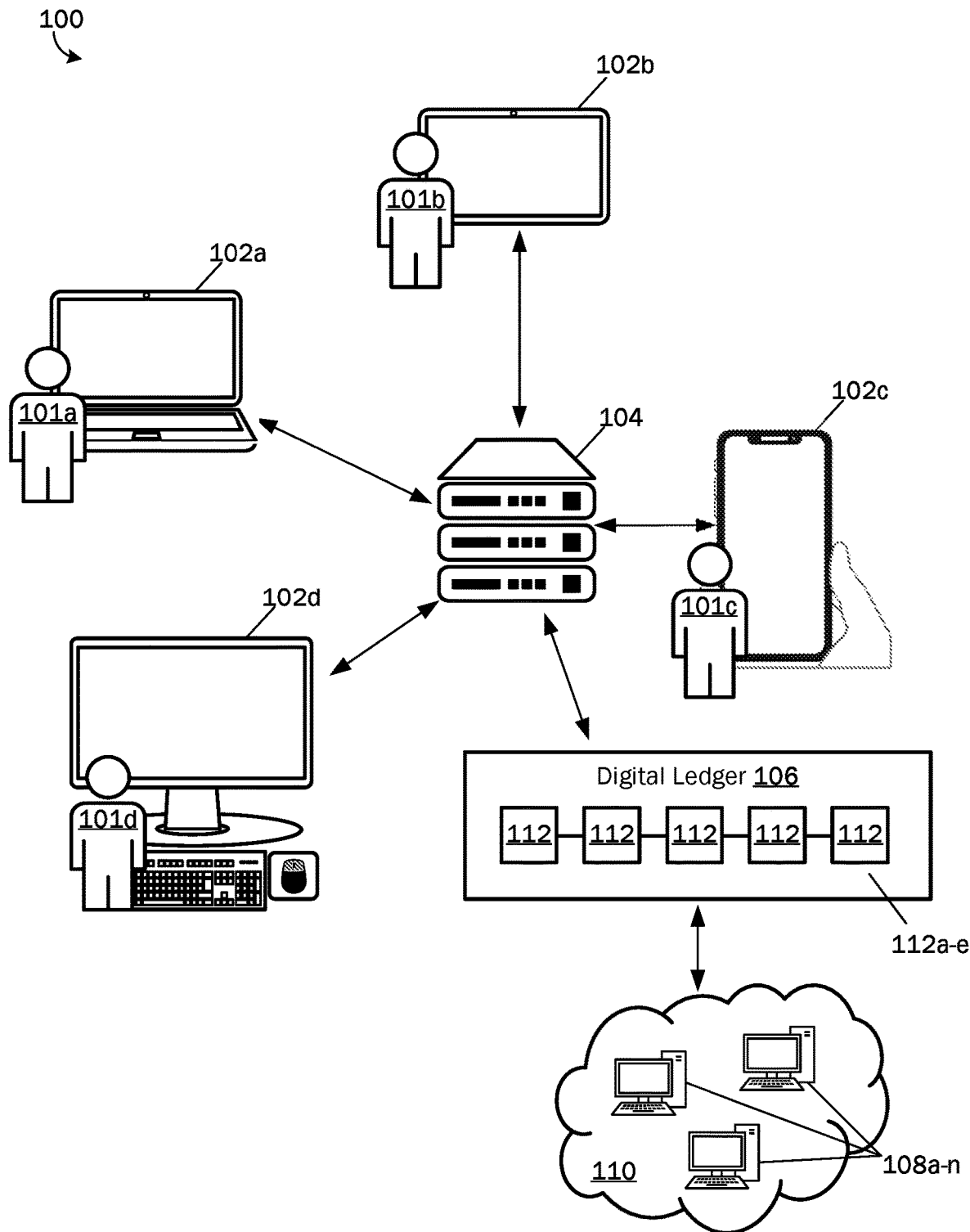
FIG. 1 depicts a system for providing retroactive recording of a meeting.

The following detailed description refers to the accompanying drawings. Wherever possible, the same reference numbers are used in the drawing and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

As briefly discussed above, recordings of presentations, meetings, and teleconferences can be useful tools for users/attendees of those meetings. Oftentimes, mid-meeting or shortly after a meeting, a user/attendee may realize that the meeting has not been recorded. Rather than having to rely solely on notes that may have been taken by a user/attendee during the meeting, an encrypted recording of the meeting may be generated including a plurality of data segments of recorded meeting content segmented based on the user/attendee providing the content stream (e.g., audio, video, audio/video, and/or shared content). The data segments of the recorded meeting content may be stored in blocks of a digital ledger, such as a blockchain for enabling transparency and fraud prevention. The recording may not be accessible until a sequence of steps are performed. As one example, one or more retroactive recording options may be presented to a meeting user/attendee, which if selected, may enable various portions of the recording to be accessed based on consent received in relation to those portions of the recording from the associated user/attendee. If a recording option is not selected or consent to access the portions of the recording is not given, the recording or portions of the recording may be deleted or made inaccessible.

FIG. 1 depicts a system 100 for retroactively recording a meeting according to an example. The system 100 includes a plurality of client devices 102a-d (herein collectively referred to as client devices 102). The client devices 102 may each be associated with, or used by, one or more users 101a-d (herein collectively referred to as users 101) or attendees of a virtual meeting. For example, a first user/attendee 101a may be associated with a first client device 102a, a second user/attendee 101b may be associated with a second client device 102b, a third user/attendee 101c may be associated with a third client device 102c, and a fourth user/attendee 101d may be associated with a fourth client device 102*d*. The client devices 102 may take a variety of forms, including desktop computers, laptops, tablets, smart phones, wearable devices, gaming devices/platforms, virtualized reality devices/platforms (e.g., virtual reality (VR), augmented reality (AR), mixed reality (MR)), etc. Each of the client devices 102 may include software and/or installed applications to allow for participation in, or connection to, a virtual meeting or teleconference. The application may be a local application for teleconferencing or virtual meetings. In other examples, the virtual meetings may be accessed via a web browser installed on the respective client device 102.

When participating in a virtual meeting or teleconference, the client devices 102 may communicate with one or more remote servers 104 that facilitate the virtual meeting. The remote device or server 104 may provide a cloud-based service that serves as a virtual meeting platform. During the virtual meeting, audio and/or video is communicated between the client devices 102 and the server 104. For instance, when the first user/attendee 101*a* speaks into a microphone of the first client device 102*a* during a virtual meeting (and is not muted), the first client device 102*a* transmits the corresponding audio to the server 104. The server 104 may combine the received audio from the client devices 102*a-d* and provide the combined audio to each of the client devices 102*a-d* participating in the virtual meeting. Similar processes may be performed for video data. For example, the cameras of the client devices 102 may capture video of the respective user and provide that video stream to the server 104.

In some examples, during a virtual meeting, one or more users 101 may also share content, such as a screen sharing activity, slide-based presentations, etc. The shared content may also be transmitted from the respective client device 102 to the server 104. The server 104 may analyze the content shared during the virtual meeting and/or store at least a portion of the content. The server 104 may also extract additional data or information from the content, such as the title of the content, the file name, or other text and/or metadata from the content.

The content data, e.g., audio, video, audio/video, shared content, and/or information associated therewith (herein referred to collectively as meeting content or meeting content streams), from the client devices 102 received by the server 104 may also be tagged with an identifier of the particular client device 102*a-d* or particular user/attendee 101*a-d* from which/whom the meeting content was received. For example, the server 104 is able to tag or label meeting content associated with the first user/attendee 101*a* or the first client device 102*a* and also tag or label meeting content associated with the second user 101*b* or the second client device 102*b* such that the two audio, video, audio/video, and/or shared content streams may be distinguished from one another.

In some examples, meeting content streams received by the server 104 may also be tagged with timestamps and/or time durations. For instance, the server 104 may tag or label the meeting content streams with timestamps according to when the corresponding audio was spoken or shared content was received such that two audio, audio/video, and/or shared content streams may be further distinguished from one another. Based on the timestamps, participation time durations (e.g., for spoken utterances, detected gestures/movements, sharing of content) of users/attendees 101 may be determined or calculated.

In some examples, the server 104 may process the received audio streams to generate a transcript of the virtual meeting. For example, the server 104 may perform an automated speech recognition (ASR) process or apply an algorithm to generate text from the received audio streams. The text may be divided and labeled based on the user/attendee 101 or client device 102 from which the audio stream was received. For instance, text in the transcript that resulted from an audio stream from the first client device 102*a* may be labeled or tagged with an identifier of the first user/attendee 101*a* or participant of the virtual meeting. In some examples, the transcript may also be generated live (e.g., in real time or substantially real-time) during the virtual meeting. For instance, the ASR processing may be performed on the audio streams as they are received by the server 104 (or within a short timeframe from receipt, such as less than 10 seconds). The live transcript may be displayed to the users/attendees 101 of the meeting at each of the respective client devices 102. For example, as the transcript is being generated by the server 104, the server 104 transmits the updates to the transcript to client devices 102. In other examples, the transcript may be generated and provided to client devices 102 after the conclusion of the virtual meeting.

In some examples, additional data may also be received and tracked by the server 104. As an example, during some virtual meetings, a text-based chat feature is provided that allows users/attendees 101 to provide text-based messages. The messages received in the chat feature may be recorded or persisted by the server 104 along with timestamps and identifications of the users/attendees 101 that provided the respective chat messages. As such, correlations between the chat messages and the meeting content streams may be identified by the server 104. In some examples, the server 104 may provide messages or notifications to users/attendees 101, which, in some examples and as will be described below, may include a request for consent to include meeting content in a recording of the meeting.

The server 104 may process received meeting content streams to generate a plurality of data segments that may collectively form a meeting recording. In alternative examples, the receiving and processing of meeting content to generate data segments may be performed locally by the client devices 102. Each data segment, for example, may include meeting content associated with a particular user/attendee 101 and associated with a timestamp and/or time duration. In some examples, the plurality of data segments may be stored in a digital ledger 106, such as in a blockchain or a similar database structure. The digital ledger 106 may provide an immutable meeting record that may be concatenated together and made available for playback based on consent given by the users/attendees 101*a-d*. For example, the digital ledger 106 may be implemented via a decentralized computing network 110 of computing nodes 108*a-n* operative to maintain a distributed data structure, where each node 108 may store a local copy of the digital ledger 106.

The data structure of the digital ledger 106, which may also be referred to as the ledger, may correspond to a linked list of blocks 112 containing transactions. The terms "blockchain", "blockchain ledger", and "ledger" may be used interchangeably and may be used to describe a record of transactions. Each transaction, for example, may correspond to a data segment generated from received meeting content streams. A set of cryptographic schemes and distributed systems protocols may enable communication among the independent digital ledgers and ensure the local copies stay in sync, updates are consistent, and no local copy of the digital ledger 106 is treated as the official or canonical copy of the stored data. Accordingly, the recordation of meeting content-related transactions stored on the digital ledger 106 may be immutable, and fraud may be minimized. For example, due to the nature of utilizing a decentralized ledger, attempts to change audio, video, and/or presented content may be easily identified and thwarted.

Figure 2:
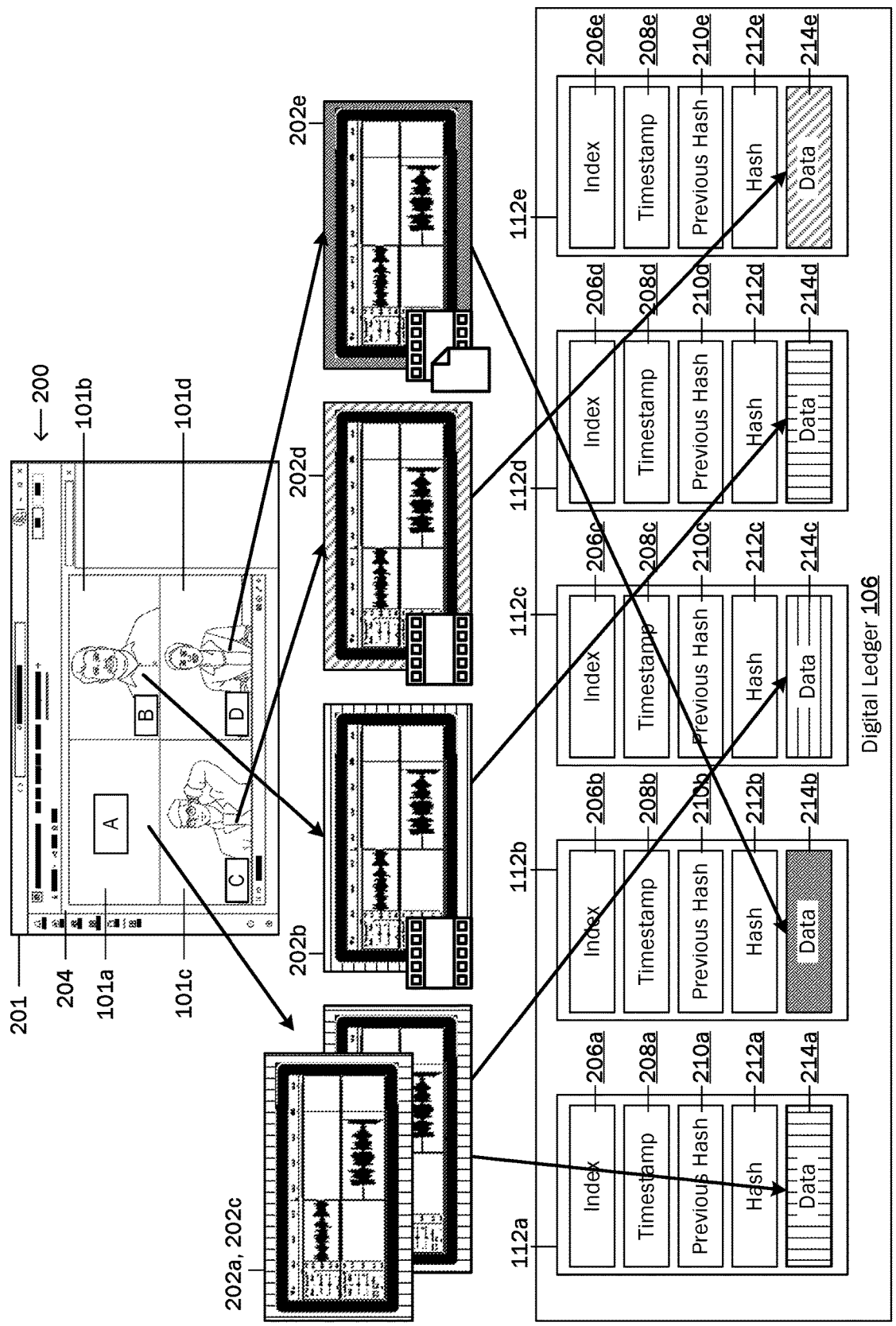
FIG. 2 depicts meeting content streams being received and stored as a plurality of data segments in a digital ledger.

An illustration of fragmentation of meeting content streams 202a-e (herein collectively referred to as content streams 202) received from an example virtual meeting 200 into a plurality of data segments 214a-f (herein collectively referred to as data segments 214) stored in a digital ledger 106 is depicted in FIG. 2. As shown, a plurality of users/attendees 101 may attend and participate in the virtual meeting 200. For example, the first user/attendee 101a may speak into a microphone of the first client device 102a a first time (for the first user/attendee 101a) during the virtual meeting 200 (during a first time period), and the corresponding audio content (e.g., a first meeting content stream 202a) may be received by the server 104. Additionally, the second user/attendee 101b may be utilizing a web camera of the second client device 102b and may speak into a microphone of the second client device 102b a first time (for the second user/attendee 101b) during the virtual meeting 200 (during a second time period). The corresponding audio and video content (e.g., second meeting content streams 202b) may be received by the server 104. Further, the first user/attendee 101a may speak into the microphone of the first client device 102a a second time (during a third time period), and the corresponding audio content (e.g., a third meeting content stream 202c) may be received by the server 104.

Next, the third user/attendee 101c may speak into a microphone of the third client device 102c a first time (for the third user/attendee 101c) during the virtual meeting 200 (during a fourth time period) and may be utilizing a web camera of the third client device 102c. The corresponding audio and video content (e.g., fourth meeting content streams 202d) may be received by the server 104. Finally, the fourth user/attendee 101d may be utilizing a web camera of the fourth client device 102d, sharing content (e.g., a document), and may speak into a microphone of the fourth client device 102d a first time (for the fourth user/attendee 101d) during the virtual meeting 200 (during a fifth time period). The corresponding audio, video, and shared content streams (e.g., fifth meeting content streams 202e) may be received by the server 104.

According to an example, the server 104 may fragment the received meeting content streams 202 into a plurality of data segments 214 corresponding to each of the users/attendees 101 and store each data segment 214 in a block 112a-e (herein collectively referred to as block 112) of a digital ledger 106. In some examples, the server 104 may be configured to fragment a meeting content stream 202 based on the tag corresponding to the particular client device 102 or particular user 101 from which/whom the meeting content stream 202 was received and based on time. The server 104 may also store additional information in each block 112 about the associated meeting content stream 202. In some examples, a block 112 may include an index 206a-e (herein collectively referred to as index 206), a timestamp 208a-e (herein collectively referred to as timestamp 208), a previous hash pointer 210a-e (herein collectively referred to as previous hash pointer 210), and a hash 212a-e (herein collectively referred to as hash 212) for the current block 112.

The index 206, for example, may be a unique numerical identifier that may be used to index the blocks 112 in the digital ledger 106. The timestamp 208 may denote a creation time of the associated meeting content stream 202. The previous hash pointer 210 may be a pointer that points to the hash 212 of the previous block 112 in the digital ledger 106 (e.g., the previous hash pointer 210b in the second block 112b may point to the hash 212a of the first block 112a). The hash 212, for example, may be a unique hash derived using one of various types of hashing algorithms (e.g., MD5, SHA-2, SHA-3). Further, the data segments 214 may be stored as a media recording file associated with particular user from which/whom the corresponding meeting content stream was received. As shown in FIG. 2, a single user/attendee, such as the first user/attendee 101a, can have a plurality of data segments (e.g., data segments 214a, 214c) stored in a plurality of blocks (e.g., blocks 112a, 112c) based on the engagement of the user/attendee 101a during the course of the virtual meeting 200.

In some examples, the virtual meetings 200 discussed herein may have a retroactive record feature that may allow a user/attendee to select to go retroactively record a meeting 200 that has already started (e.g., from the beginning of the meeting or from an earlier time in the meeting 200). For example, in response to receiving an indication that the meeting 200 has started, the server 104 may operate to automatically start recording received meeting content streams 202 of a meeting 200 in a stealth mode. When operating in the stealth mode, for example, the server 104 may automatically, without informing the users/attendees and/or receiving user/attendee consent, process received meeting content streams 202 as described above and store the received meeting content streams 202 as a plurality of data segments 214.

As described above, the data segments 214 may be encrypted and stored on a plurality of blocks 112 in a digital ledger 106 based on the particular user/attendee from which/whom the corresponding meeting content stream 202 was received. According to an aspect, to ensure privacy and security, the data segments 214 may not be accessible until a sequence of steps (described below) have been performed. According to an example, when operating in stealth mode, if, during the meeting 200 or within a predetermined grace period after the meeting 200, an option to record the in-progress or ended meeting 200 is not received from a user/attendee, the recorded meeting content streams 202 may be deleted or otherwise made inaccessible.

Figure 3A:
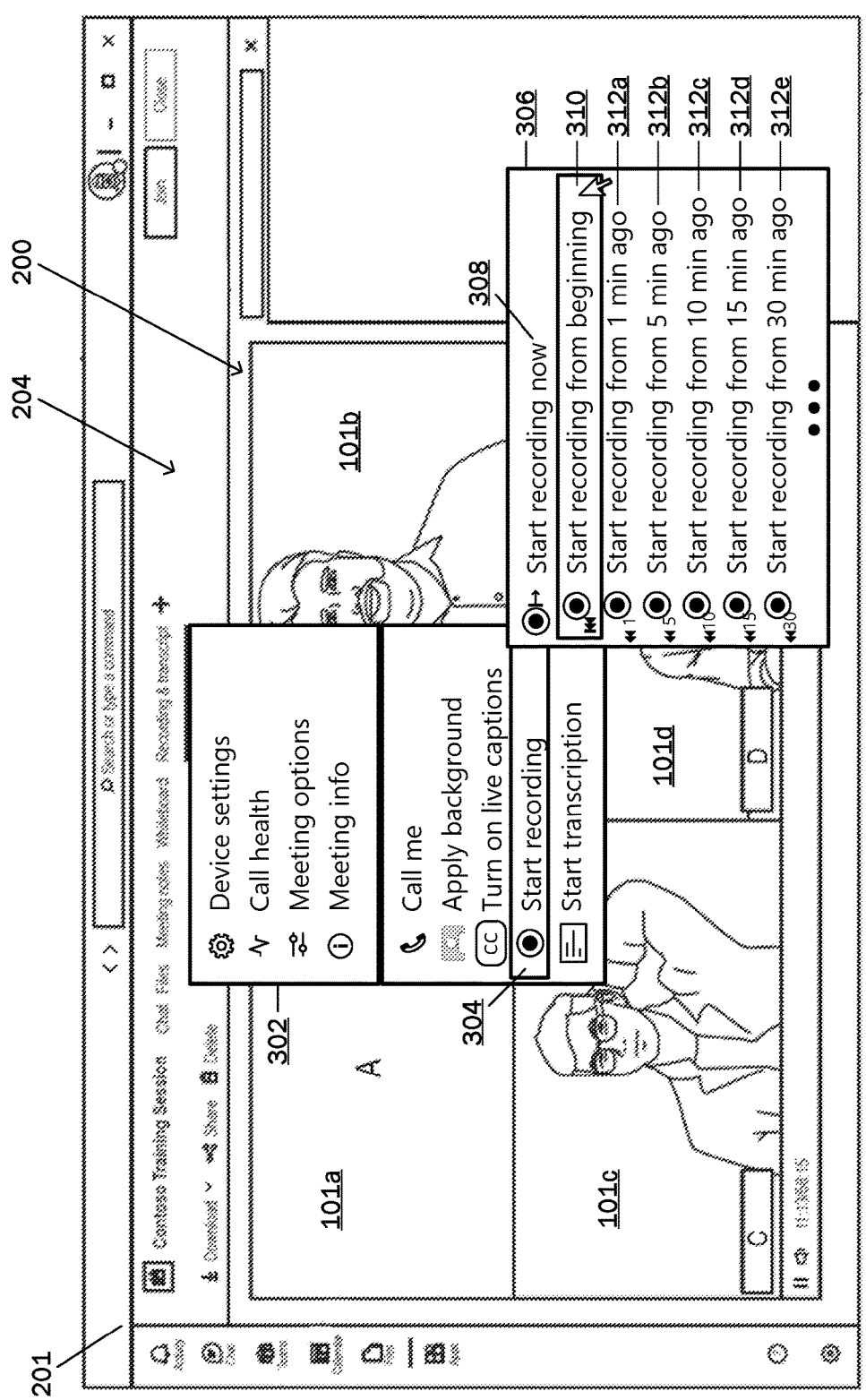
FIG. 3A depicts an example user interface for actively selecting to record a meeting.

According to another example, while the meeting 200 is in progress, a user/attendee may be able to select to record the meeting 200. For example, and as depicted in FIG. 3A, a record option 304 may be provided in a menu 302 included in the user interface 204. In some examples, when a selection is made of the record option 304, a sub-menu 306 may be displayed that may include a record now option 308, which, when selected, may indicate an intent of the user/attendee to record the meeting 200 starting at a current time (e.g., from the time the user-selection of the record option 304 was received). In some examples, in response to receiving an indication of a selection of the record now option 308, a new recording may be initiated from the current time in a non-stealth mode (e.g., normal recording mode). For instance, a new digital ledger 106 may be generated, which may be used to store data segments 214 corresponding to meeting content streams 202 that may be received from the current time. When the server 104 initiates the new recording in the non-stealth mode, an indication that the meeting 200 is being recorded may be displayed in the user interface 204, which may provide a notice to users/meeting attendees that a recording is taking place. Thus, for example, if the record now option 308 was selected by the first user/attendee 101a, and the second user/attendee 101b does not want to give consent for their participation in the meeting 200 from the current time to be recorded, the second user/attendee 101b can choose to mute the microphone, turn off the web camera, or leave the meeting 200. In some examples, blocks 112 storing data segments 214 of meeting content streams 202 received in non-stealth mode may be tagged, marked, or otherwise set as "active" and "consent given".

In some examples, when a user-selection of the record now option 308 is received, the data segments 214 stored on the digital ledger 106 at an earlier time (i.e., data segments 214 that were previously recorded and stored in the stealth mode) may be deleted. According to one example, a grace period may be provided, where the data segments 214 previously stored on the digital ledger 106 may be deleted after the grace period. The grace period, for example, may be at the end of the meeting 200 or a limited time duration after the meeting. This may allow for a user/attendee to continue to utilize the retroactive record feature after the first user-selection. As an example, if, after the first user/attendee 101a has selected the record now option 308, the third user/attendee 101c wants to go back and record the meeting 200 from an earlier time, the third user/attendee 101c may be select a retroactive record feature option (e.g., options 310, 312a-e) to indicate an intent to record the meeting 200 from an earlier time.

According to an example, and as shown in FIG. 3A, the sub-menu 306 may include one or more retroactive record feature options (e.g., options 310, 312a-e). For example, a record from beginning option 310 may be included, which when selected, may indicate an intent of the user/attendee to record the meeting 200 starting from the beginning of the meeting 200. As another example, one or more earlier retroactive record options 312a-e (herein collectively referred to as earlier retroactive record options 312) may be included, which may be associated with various times (e.g., 1 minutes ago, 5 minutes ago, 10 minutes ago, 15 minutes ago, 30 minutes ago) in which a user/attendee may select to record from retroactively from the current time.

In some examples, in response to receiving an indication of a selection of the record from beginning option 310, the server 104 may provide an indication that the meeting 200 is being recorded, which may be displayed in the user interface 204. The indication of the recording may provide a notice to users/attendees that the recording is taking place. The server 104 may continue the recording that was initiated in stealth mode. For example, the server 104 may, in the non-stealth mode, continue received processing meeting content streams 202 and storing the associated data segments 214 in the digital ledger 106.

In some examples, in response to receiving an indication of a selection of an earlier retroactive record option 312, the server 104 may provide an indication that the meeting 200 is being recorded, which may be displayed in the user interface 204. Additionally, in some implementations, the server 104 may tag or otherwise mark the data segments 214 corresponding to meeting content streams 202 received inside a selected recording time (e.g., received 5 minutes ago when a 10 minutes ago option 312c is selected) as selected for, but not yet consented to, for inclusion in a recording of the meeting 200.

Additionally, in some implementations, the server 104 may tag or otherwise mark the data segments 214 corresponding to the meeting content streams 202 that were received outside of a selected recording time (e.g., received 15 minutes ago when a 10 minutes ago option 312c is selected) to be obfuscated or made otherwise inaccessible during post processing of the meeting content streams 202.

The server 104 may continue the recording of data segments 214 in the digital ledger 106 in non-stealth mode. For example, the server 104 may further store meeting content streams 202 captured from the time of selection of the option 312 until the end of the meeting 200 or until a selection to stop recording is received in the digital ledger 106. In some examples, when recording data segments 214 in non-stealth mode, the server 104 may operate to set a flag, parameter, setting, etc., in association with the blocks 112 in which the data segments 214 are stored to "active" and "consent given".

In another implementation, the server 104 may initiate a new recording and include the portions of the previous recording that were selected for the recording. For example, a new digital ledger 106 may be generated, which may be used to store data segments 214 from the first digital ledger 106 corresponding to the meeting content streams 202 that were received during a time window from an earlier time (e.g., 1 minute ago, 10 minutes ago) associated with the selected earlier retroactive record option 312 to the time when the selection of the option 312 was received. The new digital ledger 106 may additionally be used to store the meeting content streams 202 captured from the time of selection of the option 312 until the end of the meeting 200 or until a selection to stop recording is received. The first digital ledger 106 may then be deleted, which, in some examples, may be after a grace period has expired.

According to an aspect, the server 104 may further operate to request consent from all users/attendees who participated in a meeting 200 to allow their participation in the meeting 200 that was recorded in stealth mode to be accessible to other meeting users/attendees. In some implementations, if consent is not received from one or more users/attendees (in some examples, within a short grace period within regulatory standards), one or more of the recorded meeting content streams 202 may be deleted or otherwise made inaccessible.

In some examples, when recording in stealth mode, the server 104 may operate to record data segments 214 in blocks 112 in the digital ledger 106, where no flag, parameter, setting, etc., in association with the blocks 112 may be set to "active" or "consent given". Accordingly, the corresponding data segments 214 may not be available to other users/attendees. That is, the data segments 214 that were previously recorded in stealth mode may be automatically tagged or otherwise marked as not having the consent of the associated users/attendees to include in the recording of the meeting 200. For instance, the complete meeting recording may be fragmented into a plurality of audio, video, audio/video, and/or shared content stream snippets based on the individual user/attendee. Utilizing aspects of the present disclosure, each user/attendee may be able to selectively give consent for their individual audio, video, audio/video, and/or shared content stream snippets to be available to one or more other meeting users/attendees.

Aspects of the present disclosure may further enable each user/attendee to selectively refuse to give consent for their individual audio, video, audio/video, and/or shared content stream snippets to be available to one or more other meeting users/attendees. In some examples, when consent is given by a user/attendee in association with a data segment 214, a flag, parameter, setting, etc., in association with the block 112 in which the data segment 214 is stored may be set to "active" or "consent given". Accordingly, the corresponding data segment 214 may be available to other users/attendees in a recording of the meeting 200.

According to one example, when a block 112 is marked, tagged, or otherwise set to "active" or "consent given", one or more meeting application functions, such as the transcription function, may be activated. For example, ASR processing may be performed on an audio stream of a data segment 214 stored in the block 214 that is active or for which consent is given by the associated user/attendee. In some examples, the transcript may also be generated live (e.g., in real time or substantially real-time) during the virtual meeting based on the audio streams received in non-stealth mode as they are received by the server 104 (or within a short timeframe from receipt). In some examples, the transcript may be displayed to the users/attendees of the meeting at each of the respective client devices 102. In other examples, the transcript may be provided to client devices 102 after the conclusion of the virtual meeting.

In some examples, when a selection is made to retroactively record the meeting 200 from the beginning or from another earlier time in the meeting 200, the server 104 may operate to notify each user/attendee of the meeting 200 of the recording and request the user's/attendee's consent for their individual audio, video, audio/video, and/or shared content stream snippets to be available to other meeting users/attendees. According to one example, and as depicted in FIG. 3B, a user/attendee may be notified/requested to provide consent via one or more notifications or messages 314*a,b* (herein collectively referred to as messages 314) that may be displayed in the user interface of the virtual meeting application 201, a chat or messaging application 316, or another application. In other examples, an email, a text message, a pop-up message, an alert box, or other prompt may be provided to the user/attendee.

According to an example, the user's consent response may be received via a response to the one or more messages 314. As shown in FIG. 3B, in some examples, a first option 318*a* may be provided for the second user/attendee 101*b* to give consent for particular data segments (e.g., a fourth data segment 214*d* and/or a sixth data segment 214*f*) that include meeting content from the second user/attendee 101*b*. For instance, the second user/attendee 101*b* may select the first option 318*a* in association with the first message 314*a*, which may provide consent information to the server 104 that indicates the user's intention to give consent and allow the fourth data segment 214*d* to be available to other users/attendees in a recording of the meeting 200.

In another example, a second option 318*b* may be provided for the second user/attendee 101*b* to give consent for all data segments (including 214*d,f*) with which the second user/attendee 101*b* may be associated. For instance, a selection of the second option 318*b* may provide consent information to the server 104 that indicates the user's intention to give consent and allow the fourth data segment 214*d* and the sixth data segment 214*f* to be available to other users/attendees in a recording of the meeting 200.

In another example, a third option 318*c* may be provided for the second user/attendee 101*b* to not give consent for the particular data segment 214. For instance, a selection of the third option 318*c* in association with the first message 314*a* may provide consent information to the server 104 that indicates the user's intention to not give consent and thus not allow the fourth data segment 214*d* to be available to other users/attendees in a recording of the meeting 200.

In another example, a fourth option 318*d* may be provided for the second user/attendee 101*b* to not give consent for any data segments 214 with which the second user/attendee 101*b* may be associated. For instance, a selection of the fourth option 318*d* in association with the first message 314*a* may provide consent information to the server 104 that indicates the user's intention to not give consent and thus not allow the fourth data segment 214*d* or the sixth data segment 214*f* to be available to other users/attendees in a recording of the meeting 200.

In another example, a fifth option 318*e* may be provided for the user/attendee to select advanced sharing or permission options for the data segment 214*d,f*. For example, the advanced sharing or permission options may allow the second user/attendee 101*b* to select to query the data segment 214 for specific content (e.g., spoken terms, subject matter, shared content) and give or not give consent to share the data segment 214 based on the query result. Alternatively, the advanced sharing or permission options may enable the second user/attendee 101*b* to selectively share the data segment 214 with specific meeting attendees. In other examples, the advanced sharing or permission options may enable the second user/attendee 101*b* to give consent to share a particular type of content (e.g., consent to share audio, but not video content).

In some examples, a non-response by a user/attendee in association with a request for consent for a data segment 214 may be determined to be an indication that the user/attendee 101 does not give consent for the associated data segment 214 to be available to other users/attendees in a recording of the meeting 200. As should be appreciated, the example user interfaces and options are intended for illustrative purposes. Other user interfaces and options via which users/attendees may provide a consent response are possible and are within the scope of the present disclosure.

In some implementations, a web-based collaboration framework may be used for collecting consent responses made by users/attendees. In some examples, based on received consent responses, the server 104 may tag or otherwise mark the corresponding data segments 214 with the associated permissions. For instance, a data segment 214 may be tagged as accessible to other meeting attendees based on a selection made by the user/attendee to give consent to include the data segment 214 in the recording. As another example, a data segment 214 may be tagged as not accessible to other meeting attendees based on a selection made by the user/attendee to not give consent to include the data segment 214 in the recording. As another example, a data segment 214 may not be tagged as accessible if a consent response is not received from the associated user/attendee. As mentioned above, if consent is not received from at least one user/attendee, or in some examples, from a predetermined minimum number of users/attendees, all recorded meeting content streams 202 may be deleted or otherwise made inaccessible.

According to an example, when consent is not received for a data segment 214 to be included in the recording, during a post processing operation, the data segment 214 may be muted and/or otherwise obfuscated before making the data segment 214 available for future playback. Thus, for example, if the first user/attendee 101*a* selects to play back the recording, during playback, data segments 214 for which permission or consent is not given by the second user/attendee 101*b* may not be audible or viewable to the first user/attendee 101*a*. Playback, for example, may be provided by a streaming application or service.

Figure 4A:
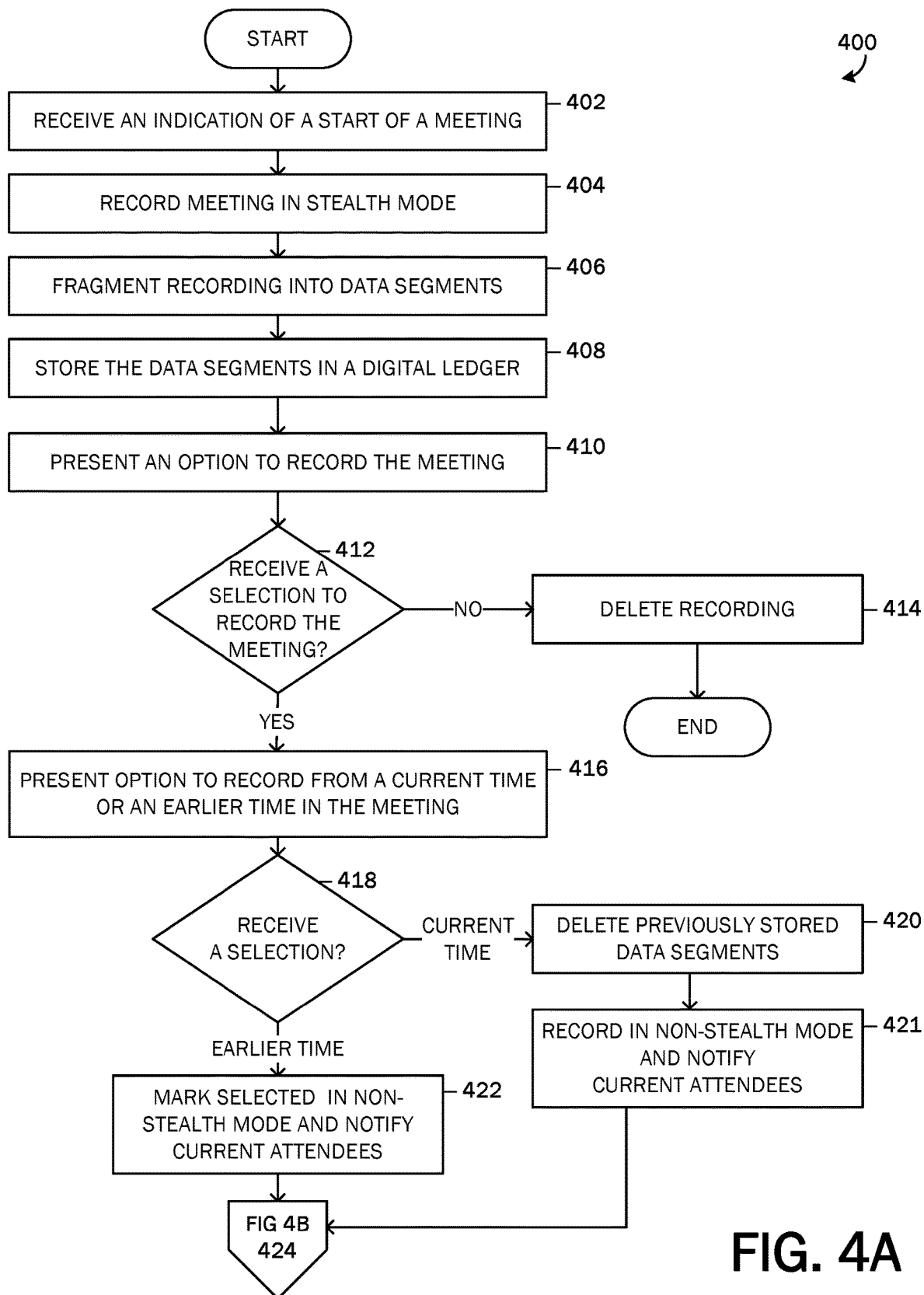
FIGS. 4A and 4B depict an example method for recording a meeting using a retroactive record feature.
Figure 4B:
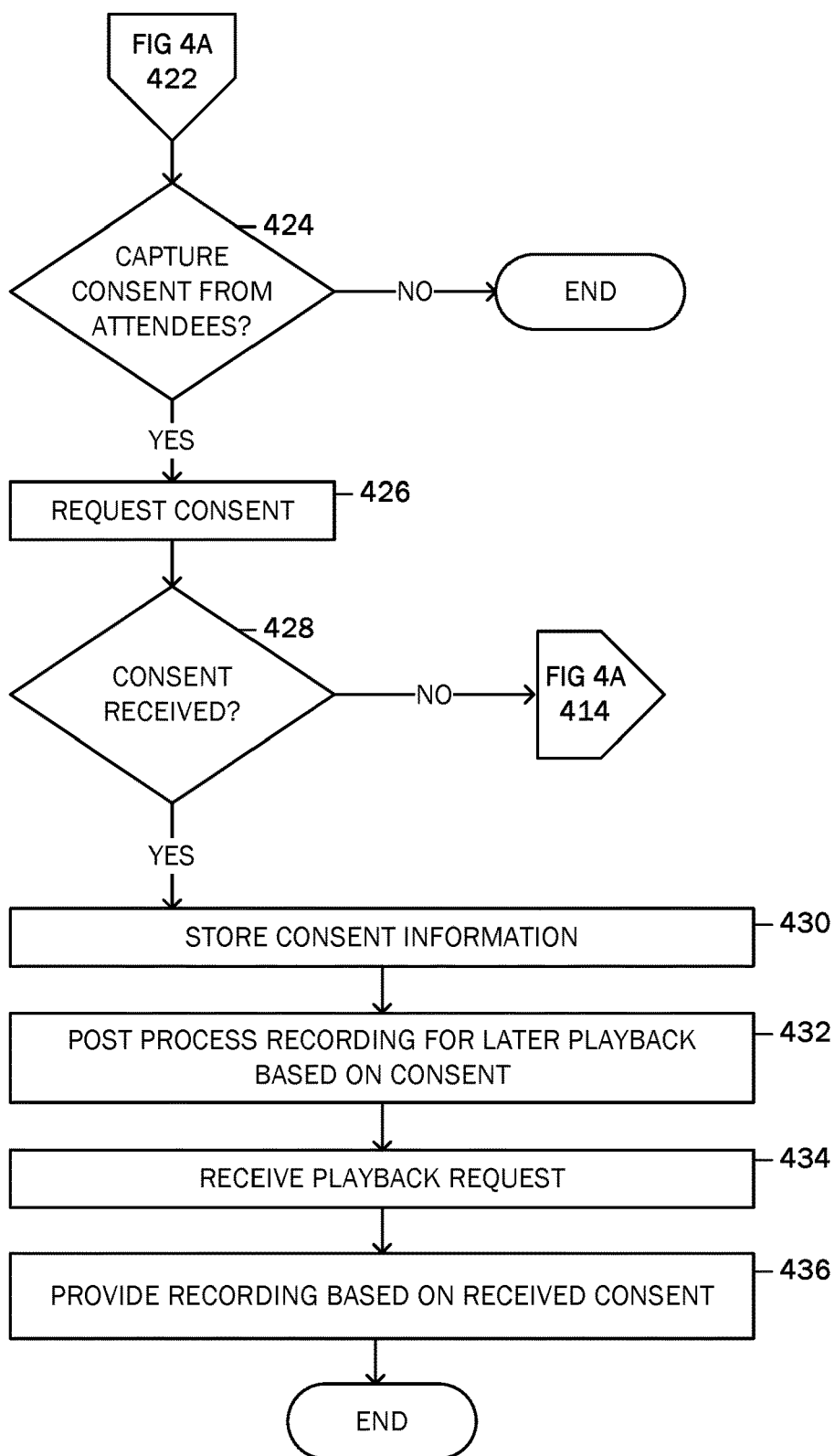

FIGS. 4A-B depict an example method 400 for recording a meeting 200 using a retroactive record feature. The operations of method 400 may be performed by one or more computing devices, such as a computing device that is facilitating a virtual meeting. For example, the method may be performed by the one or more servers 104 depicted in FIG. 1. Various operations of the method 400 may be performed during a virtual meeting 200 and/or after the conclusion of the virtual meeting 200.

At operation 402, an indication that a virtual meeting 200 has started may be received. In some examples, the virtual meeting 200 may start when a user/attendee 101 of the meeting 200 joins the meeting 200 at or approximate to a scheduled time of the meeting 200. In other examples, the meeting 200 may start at or approximate to a scheduled time of the meeting and prior to a user/attendee 101 joining the meeting 200.

At operation 404, a recording of the meeting 200 may be automatically initiated in stealth mode. For example, in stealth mode, the server 104 may be configured to record the meeting 200 inactively (e.g., without receiving a user selection), where the recorded meeting video, audio, and/or shared content streams may be encrypted and not accessible to any user/attendee 101 until a sequence of steps have been performed. According to an example, the sequence of steps may include receiving an action of a user intent to record the meeting 200 and receiving consent from at least one user/attendee 101 for at least one portion of the recording (i.e., data segment 214 corresponding to a meeting content stream 202 received during the virtual meeting 200). Additionally, the server 104 may not provide an indication that the meeting 200 is being recorded, given that the server 104 may be configured to delete/make inaccessible the recording if a selection to record the meeting 200 is not received from a user/attendee 101.

At operation 406, meeting content streams 202 (e.g., audio, video, and/or shared content streams) may be received from a plurality of remote client devices 102. For example, client devices 102 associated with different users/attendees 101 of a virtual meeting 200 may transmit the audio captured by respective microphones, video captured by respective cameras, and/or shared content to a server 104 that is facilitating the virtual meeting 200. The received meeting content streams 202 may be processed by the server 104 for fragmenting the received meeting content streams 202 into a plurality of data segments 214. For example, the recording may be segmented into data segments corresponding to each user/attendee 101, each occurrence of content being provided by each user/attendee 101, content stream type (e.g., audio, video, shared content), content stream content (e.g., terms, phrases, topics in the content), or the like.

At operation 408, each data segment 214 may be stored in a block 112 of a digital ledger 106. In some examples, the server 104 may also store additional information about the associated meeting content stream 202 in each block 112. As described above, each block 112 may include one or more of an index 206, a timestamp 208, a previous hash pointer 210, and a hash 212 for the current block 112. It is contemplated that, in other examples, each block 112 may include additional or less information than described above.

At operation 410, a record option 304 may be provided in the virtual meeting application user interface 204. The record option 304 may enable a user/attendee 101 to actively select to record the meeting 200.

At decision operation 412, a determination may be made as to whether a user selection to record the meeting 200 has been received. For example, a user selection or intent to record the meeting 200 may be received at a time between the start of the meeting 200 and the end of the meeting 200 or after a grace period has expired. When a determination is made that, after the end of the meeting 200 or after the grace period has expired, a selection to record the meeting 200 has not been received, the recorded meeting content streams 202 may be deleted or otherwise made inaccessible at operation 414. The method may then end. Otherwise, when a determination is made that a selection to record the meeting 200 has been received, at operation 416, one or more retroactive record feature options (e.g., options 310, 312a-e) may be provided in the user interface 204. The retroactive record feature options may be selected by a user/attendee 101 to indicate an intent to start recording the meeting 200 from a current time or to start recording the meeting 200 from an earlier time (e.g., the beginning of the meeting 200 or another earlier time in the meeting 200).

At decision operation 418, a determination may be made as to whether a user selection indicates an intent to record the meeting 200 from the current time or an earlier time. When a selection to record the meeting 200 from the current time is received, at operation 420, the previous recorded meeting content streams 202 may be deleted or otherwise made inaccessible. In some examples, the previous recorded meeting content streams 202 may be deleted or otherwise made inaccessible after a grace period has expired. At operation 421, the server 104 may continue the recording of data segments 214 in a new (e.g., second) digital ledger 106 in non-stealth mode.

Alternatively, if at decision operation 418, a determination is made that a selection to use the retroactive feature has been made to record the meeting 200 from an earlier time, at operation 422, the data segments 214 corresponding to the recorded meeting content streams 202 outside the time window associated with a selected retroactive record option 310, 312a-e may be tagged or otherwise marked to be obfuscated or otherwise inaccessible during post processing of the meeting content streams 202. In some examples, the data segments 214 corresponding to the meeting content streams 202 received inside the time window associated with a selected retroactive record option 310, 312a-e may be tagged or otherwise marked as selected for, but not yet consented to, inclusion in a recording of the meeting 200. Additionally, the server 104 may continue the recording of data segments 214 in the digital ledger 106 in non-stealth mode. As described above, blocks 112 which may store data segments 214 recorded in non-stealth mode may be set to "active" and "consent given" and may be made available to other users/attendees of the meeting 200.

For example, if the meeting 200 is in progress, an indication that the meeting 200 is being recorded may be displayed in the user interface 204, which may provide a notice to users/meeting attendees 101 that a recording is taking place. data segments 214 processed from meeting content streams 202 that may be received from the current time to the end of the meeting 200 or recording.

The method 400 may continue to decision operation 424 shown in FIG. 4B, where a determination may be made as to whether to capture consent from the meeting users/attendees 101. For example, the server 104 may be configured to request consent from each user/attendee 101 whose participation in the meeting 200 may have been recorded in stealth mode. If a selection was made (at operation 418) to record from the current time, a determination may be made at decision operation 424 that consent may not need to be captured, and the method 400 may end. For example, the indication displayed in non-stealth mode that the recording is taking place may provide notice to meeting users/attendees 101. In such an example, if a user/attendee 101 did not want to give consent for their participation in the meeting 200 from the current time to be recorded, the user 101 could choose to mute the microphone, turn off the web camera, or leave the meeting 200.

If a selection was made (at operation 418) of a retroactive record feature, at operation 426, requests for consent may be provided to the meeting users/attendees 101. As described above, consent may be given for one or more individual data segments 214 of recorded meeting content streams 202. In some examples, if the meeting 200 is in-progress, a notification or message 314 may be displayed in the user interface 204 of the virtual meeting application 201. In another example, a notification or message 314 may be provided via a chat or messaging application, as an email, a text message, a pop-up message, an alert box, or other prompt that may notify the user/attendee 101 of a request for the user/attendee's consent for allowing access to a recorded data segment 214 of that user/attendee's participation (e.g., audio/video stream) in the meeting 200.

At decision operation 428, a determination may be made as to whether consent has been received in association with each data segment 214 of the recording. In some examples, this determination may be made after a predetermined time period. If a determination is made that consent has not been received for any data segments 214, or if consent has not been received for a predetermined minimum number or percentage of data segments 214 of the recording, the method 400 may return to operation 414 in FIG. 4A, where the recorded meeting content streams 202 may be deleted or otherwise be made inaccessible.

When consent is received at decision operation 428, consent responses may be stored at operation 430. In some examples, a data segment 214 may be tagged or otherwise marked with consent response information. For instance, an indicator of consent, such as a flag, a parameter, or a similar setting, may be applied (e.g., affixed or otherwise appended) to a header portion or body portion of the data segment 214. During a post processing operation at operation 432, data segments 214 for which consent may not be received from the associated users/attendees 101 may be muted/obfuscated based on the consent response information. Accordingly, when a request for playback of the recording is received from a user/attendee 101 at operation 434, the recording (or portions thereof) may be provided to the requesting user/attendee 101 at operation 436 based on the received consent.

Figure 5:
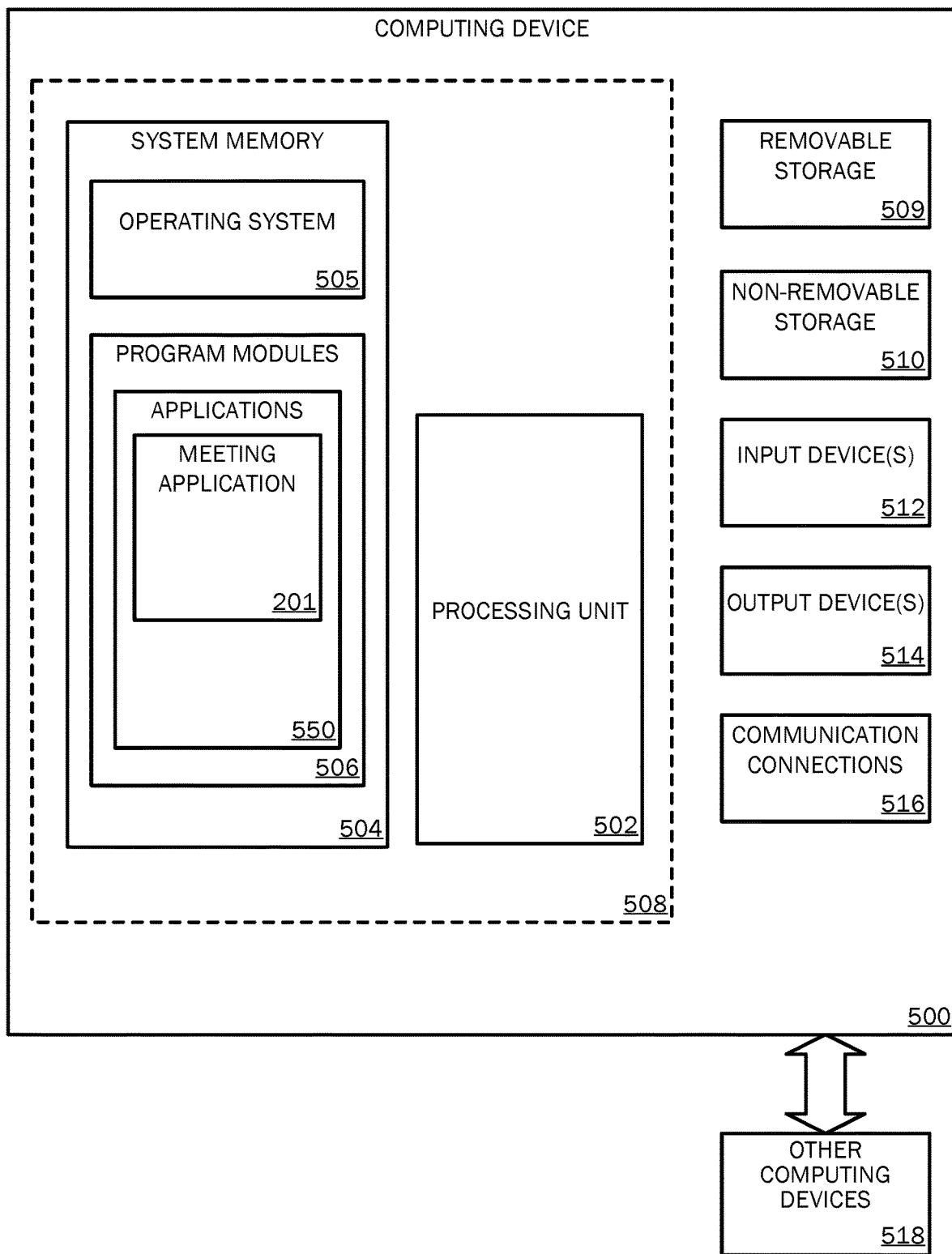
FIG. 5 is a block diagram illustrating example physical components of a computing device with which aspects of the invention may be practiced.
Figure 6A:
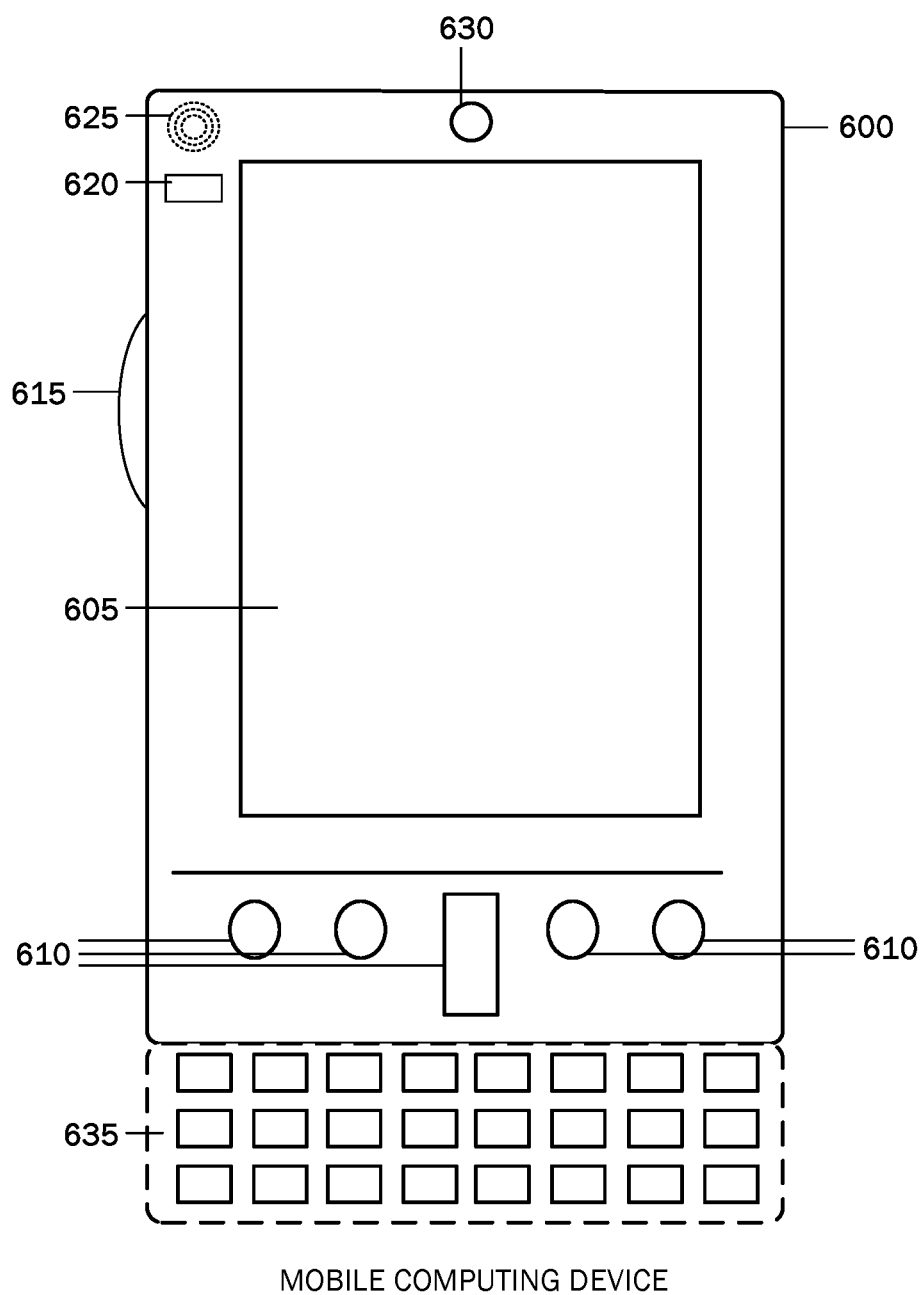
FIGS. 6A and 6B are simplified block diagrams of a mobile computing device with which aspects of the present invention may be practiced.
Figure 6B:
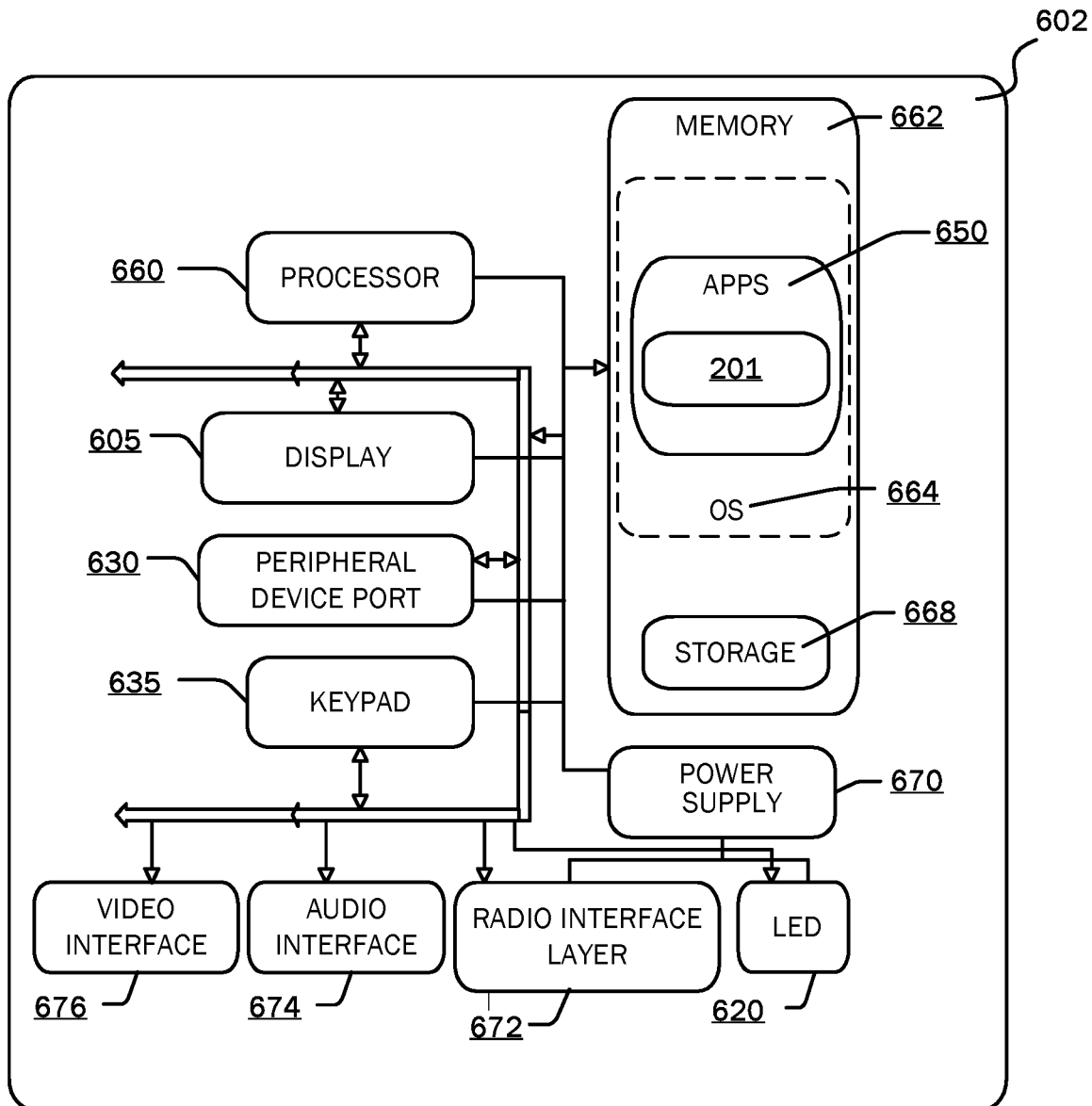

FIGS. 5, 6A, and 6B and the associated descriptions provide a discussion of a variety of operating environments in which examples of the invention may be practiced. However, the devices and systems illustrated and discussed with respect to FIGS. 5, 6A, and 6B are for purposes of example and illustration and are not limiting of a vast number of computing device configurations that may be utilized for practicing aspects of the invention, described herein.

FIG. 5 is a block diagram illustrating physical components (i.e., hardware) of a computing device 500 with which examples of the present disclosure may be practiced. The computing device components described below may be suitable for the client device 102 described above. In a basic configuration, the computing device 500 may include at least one processing unit 502 and a system memory 504. Depending on the configuration and type of computing device 500, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 such as a virtual meeting application 201.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the stages of the method 400 illustrated in FIG. 4. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 500 may also have one or more input device(s) 512 such as a keyboard, a mouse, a pen, a sound input device, a touch input device, a camera, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects of the invention may be practiced. With reference to FIG. 6A, an example of a mobile computing device 600 for implementing at least some aspects of the present technology is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In alternative examples, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., video-conference or virtual meeting application, browser, e-mail, calendaring, contact managers, messaging clients, games, and media clients/players). In some examples, the system 602 is integrated as a computing device, such as an integrated personal digital assistant (PDA) and wireless phone.

One or more application programs 650 (e.g., a virtual meeting application 201) may be loaded into the memory 662 and run on or in association with the operating system 664. Examples of the application programs include video-conference or virtual meeting programs, phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at a remote device or server. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

The visual indicator 620 may be used to provide visual notifications and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape.

Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

As will be understood from the foregoing disclosure, many technical advantages and improvements over preexisting meeting recording technologies result from the present technology. For instance, the present technology provides for proactively recording a meeting prior to receiving a user/attendee recording request, fragmenting meeting content into encrypted data segments corresponding to individual users/attendees and/or occurrences of content being provided by each user/attendee, storing and managing the data segments in a blockchain using distributed database technology, enabling users/attendees to selectively provide consent for accessing individual data segments in the blockchain, providing consent requests to users/attendees after a meeting has ended or after a user/attendee has disconnected from an in-progress meeting, configuring the individual data segments with flags/parameters/settings that indicate whether a data segment is authorized for playback, processing the data segments flags/parameters/settings to provide playback of the recording of the meeting, deleting portions of a meeting for which recording was not requested or consent was not given to decrease data storage requirements for meeting data, and making portions of a meeting inaccessible after the meeting (or a grace period) have ended to decrease unauthorized access to meeting data, among other examples.

As will also be understood from the foregoing disclosure, in an aspect, the present technology relates to a system for recording a meeting. The system includes at least one processor; and memory storing instructions that, when executed by the at least one processor, cause the system to receive an indication of a start of the meeting; receive one or more content streams associated with attendees of the meeting, wherein each of the one or more content streams comprises content data; generate a plurality of data segments using the one or more content streams, wherein each data segment is associated with a timestamp and an attendee and includes content data from the attendee; store the plurality of data segments in a digital ledger; receive a selection to record the meeting; in response to receiving the selection to record the meeting, present an option to record the meeting at a current time or from an earlier time in the meeting; when the option to record the meeting from the earlier time in the meeting is selected, request consent from one or more attendees of the meeting to include one or more data segments of the plurality of data segments in a recording of the meeting, wherein the one or more data segments correspond to the earlier time in the meeting; initiate the recording; apply consent response information to the one or more data segments in response to receiving a consent response from the one or more attendees of the meeting, wherein the consent response information indicates at least one of: consent has been given to include at least a portion of the one or more data segments in the recording; or consent has not been given to include at least a portion of the one or more data segments in the recording; and include, in the recording, data segments for which consent has been given.

In another aspect, the present technology relates to a computer-implemented method for retroactively recording a meeting, comprising: receiving an indication of a start of the meeting; receiving one or more content streams associated with attendees of the meeting, wherein each of the one or more content streams comprises content data; generating a plurality of data segments using the one or more content streams, wherein each data segment is associated with a timestamp and an attendee and includes content data from the attendee; storing the plurality of data segments in a digital ledger; receiving a selection to record the meeting; in response to receiving the selection to record the meeting, presenting an option to record the meeting at a current time or from an earlier time in the meeting; when the option to record the meeting from the earlier time in the meeting is selected, requesting consent from one or more attendees of the meeting to include one or more data segments of the plurality of data segments in a recording of the meeting, wherein the one or more data segments correspond to the earlier time in the meeting; initiating the recording; applying consent response information to the one or more data segments in response to receiving a consent response from the one or more attendees of the meeting, wherein the consent response information indicates at least one of: consent has been given to include at least a portion of the one or more data segments in the recording; or consent has not been given to include at least a portion of the one or more data segments in the recording; and including, in the recording, data segments for which consent has been given.

In another aspect, the present technology relates to a computer-readable medium storing instructions that, when executed by a computer, cause the computer to: receive an indication of a start of the meeting; receive one or more content streams associated with attendees of the meeting, wherein each of the one or more content streams comprises content data; generate a plurality of data segments using the one or more content streams, wherein each data segment is associated with a timestamp and an attendee and includes content data from the attendee; store the plurality of data segments in a plurality of blocks in a blockchain; receive a selection to record the meeting; in response to receiving the selection to record the meeting, present an option to record the meeting at a current time or from an earlier time in the meeting; when the option to record the meeting from the earlier time in the meeting is selected: initiate a recording of the meeting; notify the attendees of the meeting that the meeting is being recorded; receive one or more additional content streams associated with attendees of the meeting; request consent from one or more attendees of the meeting to include one or more data segments of the plurality of data segments in the recording of the meeting, wherein the one or more data segments comprise content data received between the earlier time and the current time; apply consent response information to the one or more data segments in response to receiving a consent response from the one or more attendees of the meeting, wherein the consent response information indicates at least one of: consent has been given to include at least a portion of the one or more data segments in the recording; or consent has not been given to include at least a portion of the one or more data segments in the recording; and include in the recording of the meeting: the one or more data segments comprising content data received between the earlier time and the current time for which consent has been given to include in the recording; and one or more additional data segments corresponding to the one or more additional content streams received after the current time and prior to the end of the meeting.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

I claim:

1. A system for retroactively recording a meeting, the system comprising:
    at least one processor; and
    memory storing instructions that, when executed by the at least one processor, cause the system to:
        receive an indication of a start of the meeting;
        receive one or more content streams associated with attendees of the meeting, wherein each of the one or more content streams comprises content data;
        generate a plurality of data segments using the one or more content streams, wherein each data segment is associated with a timestamp and an attendee and includes content data from the attendee;
        store the plurality of data segments in a digital ledger;
        receive a selection to record the meeting;
        in response to receiving the selection to record the meeting, present an option to record the meeting at a current time or from an earlier time in the meeting;
        when the option to record the meeting from the earlier time in the meeting is selected, request consent from each attendee of the attendees of the meeting to include respective data segments of the attendee from the plurality of data segments in a recording of the meeting, wherein the respective data segments include content data corresponding to the earlier time in the meeting;
        in response to receiving a consent response from one or more of the attendees of the meeting, initiate the recording; and
        apply consent response information to the respective data segments, wherein, for each attendee of the attendees of the meeting, the consent response information:
            indicates at least one of:
                consent has been given by the attendee to include the respective data segments of the attendee in the recording; or
                consent has not been given by the attendee to include the respective data segments of the attendee in the recording;
            causes the respective data segments of each attendee providing the consent response information to be played during playback of the recording; and
            causes the respective data segments of each attendee not providing the consent response information to not be played during playback of the recording.

2. The system of claim 1, wherein, when the option to record the meeting from the earlier time in the meeting is selected, the instructions further cause the system to:
    notify the attendees of the meeting that the meeting is being recorded; and
    include, in the recording, at least one data segment corresponding to a content stream received from the attendees of the meeting after the option to record the meeting from the earlier time in the meeting is selected.

3. The system of claim 1, wherein the recording further includes one or more obfuscated data segments corresponding to one or more data segments for which consent is not given by an associated attendee.

4. The system of claim 1, wherein the recording further includes one or more obfuscated data segments corresponding to one or more data segments for which a consent response is not received from an associated attendee.

5. The system of claim 1, wherein the instructions further cause the system to:
    for each of the plurality of data segments:
        notify an associated attendee of the data segment;
        request consent from the associated attendee to include the data segment in the recording;
        receive a consent response from the associated attendee, the consent response including at least a portion of the consent response information; and
        when consent is given by the associated attendee to include the data segment in the recording, mark the data segment to make the data segment to be included in the recording.

6. The system of claim 5, wherein notifying the associated attendee comprises at least one of:
    displaying a notification;
    sending a text message; or
    sending an email.

7. The system of claim 1, wherein the digital ledger is a blockchain and each data segment is stored in a block in the blockchain.

8. The system of claim 1, wherein the earlier time in the meeting is the start of the meeting.

9. The system of claim 1, wherein the earlier time in the meeting corresponds to an amount of time presented as an option and selected by the attendee, wherein the amount of time represents a time offset from the current time from which to start the recording.

10. The system of claim 1, wherein, when less than a requisite number of consent responses are received from the attendees of the meeting, the recording is deleted or made inaccessible.

11. The system of claim 1, wherein when the option to record the meeting at the current time is selected, the instructions cause the system to:
   initiate the recording of the meeting;
   notify the attendees of the meeting that the meeting is being recorded;
   receive, prior to the meeting ending, one or more additional content streams associated with the attendees of the meeting;
   generate a plurality of additional data segments using the one or more additional content streams;
   store the plurality of additional data segments in a new digital ledger; and
   include the plurality of additional data segments in the recording of the meeting.

12. A computer-implemented method for retroactively recording a meeting, comprising:
   receiving an indication of a start of the meeting;
   receiving one or more content streams associated with attendees of the meeting, wherein each of the one or more content streams comprises content data;
   generating a plurality of data segments using the one or more content streams, wherein each data segment is associated with a timestamp and an attendee and includes content data from the attendee;
   storing the plurality of data segments in a digital ledger;
   receiving a selection to record the meeting;
   in response to receiving the selection to record the meeting, presenting an option to record the meeting at a current time or from an earlier time in the meeting;
   when the option to record the meeting from the earlier time in the meeting is selected, requesting consent from each attendee of the attendees of the meeting to include respective data segments of the attendee from the plurality of data segments in a recording of the meeting, wherein the respective data segments include content data corresponding to the earlier time in the meeting;
   in response to receiving a consent response from one or more of the attendees of the meeting, initiating the recording; and
   applying consent response information to the respective data segments, wherein, for each attendee of the attendees of the meeting, the consent response information:
      indicates at least one of:
         consent has been given by the attendee to include the respective data segments of the attendee in the recording; or
         consent has not been given by the attendee to include the respective data segments of the attendee in the recording;
      causes the respective data segments of each attendee providing the consent response information to be played during playback of the recording; and
      causes the respective data segments of each attendee not providing the consent response information to not be played during playback of the recording.

13. The method of claim 12, wherein, when the option to record the meeting from the earlier time in the meeting is selected, the method further comprises:
   notifying the attendees of the meeting that the meeting is being recorded; and
   indicating to the attendees of the meeting that a transcript function is activated.

14. The method of claim 13, wherein the transcript function is activated at the start of the meeting and a transcript is recorded of the portion of the meeting that occurred prior to receiving selection of the option to record the meeting from the earlier time.

15. The method of claim 14, wherein the transcript of the portion of the meeting that occurred prior to receiving selection of the option to record the meeting from the earlier time is not accessible to the attendees of the meeting until the option to record the meeting from the earlier time in the meeting is selected.

16. The method of claim 12, wherein the method further comprises:
   obfuscating one or more data segments corresponding to data segments for which consent is not given by an associated attendee; and
   obfuscating one or more data segments corresponding to data segments for which a consent response is not received from an associated attendee.

17. The method of claim 12, wherein when the option to record the meeting at the current time is selected, the method further comprises:
   initiating the recording of the meeting;
   notifying the attendees of the meeting that the meeting is being recorded;
   receiving, prior to the meeting ending, one or more additional content streams associated with the attendees of the meeting;
   generating a plurality of additional data segments using the one or more additional content streams;
   storing the plurality of additional data segments in a new digital ledger; and
   including the plurality of additional data segments in the recording of the meeting.

18. A non-transitory storing instructions that, when executed by a computer, cause the computer to:
   receive an indication of a start of the meeting;
   receive one or more content streams associated with attendees of the meeting, wherein each of the one or more content streams comprises content data;
   generate a plurality of data segments using the one or more content streams, wherein each data segment is associated with a timestamp and an attendee and includes content data from the attendee;
   store the plurality of data segments in a plurality of blocks in a blockchain;
   receive a selection to record the meeting;
   in response to receiving the selection to record the meeting, present an option to record the meeting at a current time or from an earlier time in the meeting;
   when the option to record the meeting from the earlier time in the meeting is selected:
      initiate a recording of the meeting;
      notify the attendees of the meeting that the meeting is being recorded;
      receive one or more additional content streams associated with attendees of the meeting;
      request consent from each attendee of the attendees of the meeting to include respective data segments of the attendee from the plurality of data segments in the recording of the meeting, wherein the respective data segments comprise content data received between the earlier time and the current time; and apply consent response information to the respective data segments for each attendee of the attendees of the meeting, wherein the consent response information:

indicates at least one of:
consent has been given by the attendee to include the respective data segments of the attendee in the recording; or
consent has not been given by the attendee to include the respective data segments of the attendee in the recording; and
causes the respective data segments of each attendee providing the consent response information to be played during playback of the recording; and causes the respective data segments of each attendee not providing the consent response information to not be played during playback of the recording.

19. The non-transitory of claim 18, wherein, when less than a requisite number of the attendees of the meeting have given consent to include the plurality of data segments in the recording, the recording is deleted or made inaccessible to the attendees of the meeting.

20. The non-transitory of claim 18, wherein causing the respective data segments of each attendee not providing the consent response information to not be played during playback of the recording comprises including in the recording an obfuscated version of the respective data segments.

* * * * *